(12) United States Patent
Choi et al.

(10) Patent No.: US 8,603,676 B2
(45) Date of Patent: *Dec. 10, 2013

(54) CATHODE MATERIALS HAVING HIGH ENERGY DENSITY AND LITHIUM SECONDARY BATTERY CONTAINING THE SAME

(75) Inventors: Seungeun Choi, Daejeon (KR); Eunyoung Goh, Daejeon (KR); Hyang Mok Lee, Daejeon (KR); Heegyoung Kang, Cheonan-si (KR); Sangbaek Ryu, Daejeon (KR); Kiwoong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/223,754

(22) Filed: Sep. 1, 2011
(Under 37 CFR 1.47)

(65) Prior Publication Data
US 2012/0225343 A1  Sep. 6, 2012

Related U.S. Application Data

(63) Continuation of application No. PCT/KR2010/001305, filed on Mar. 3, 2010.

(30) Foreign Application Priority Data

Mar. 3, 2009 (KR) .................. 10-2009-0018123

(51) Int. Cl.
- *H01M 4/52* (2010.01)
- *H01M 4/50* (2010.01)
- *H01M 4/131* (2010.01)

(52) U.S. Cl.
USPC .... 429/223; 429/224; 429/231.3; 429/231.95

(58) Field of Classification Search
USPC .................................. 429/121–347
See application file for complete search history.

(56) References Cited

U.S. PATENT DOCUMENTS

| | | | |
|---|---|---|---|
| 6,436,577 | B1 | 8/2002 | Kida et al. |
| 2008/0026292 | A1* | 1/2008 | Paulsen et al. ............ 429/231.3 |
| 2008/0070100 | A1* | 3/2008 | Jang et al. ...................... 429/65 |

FOREIGN PATENT DOCUMENTS

KR  10-2007-0109854 A  11/2007

OTHER PUBLICATIONS

International Search Report, dated Sep. 30, 2010, for Application No. PCT/KR2010/001305.
Liu et al., "A mixture of LiNi1/3Co1/3Mn1/3O2 and LiCoO2 as positive active material of LIB for power application", Journal of Power Sources, vol. 174, No. 2, pp. 1126-1130, 2007 (Available online Jun. 30, 2007).

* cited by examiner

*Primary Examiner* — Basia Ridley
*Assistant Examiner* — James Lee
(74) *Attorney, Agent, or Firm* — Birch, Stewart, Kolasch & Birch, LLP.

(57) ABSTRACT

Disclosed is a cathode material comprising a mixture of an oxide powder (a) defined herein and an oxide powder (b) selected from the group consisting of an oxide powder (b1) defined herein and an oxide powder (b2) defined herein and a combination thereof wherein a mix ratio of the two oxide powders (oxide powder (a):oxide powder (b)) is 50:50 to 90:10. The cathode material uses a combination of an oxide powder (a) and 50% or less of an oxide powder (b) which can exert high capacity, high cycle stability, superior storage stability and high-temperature stability, thus advantageously exhibiting high energy density and realizing high capacity batteries.

18 Claims, 2 Drawing Sheets

CATHODE MATERIALS HAVING HIGH ENERGY DENSITY AND LITHIUM SECONDARY BATTERY CONTAINING THE SAME

CROSS REFERENCE TO RELATED APPLICATIONS

This application is a Continuation of PCT/KR2010/001305 filed on Mar. 3, 2010, which claims priority under 35 U.S.C. 119(a) to Patent Application No. 10-2009-0018123 filed in the Republic of Korea on Mar. 3, 2009, all of which are hereby expressly incorporated by reference into the present application.

TECHNICAL FIELD

The present invention relates to a cathode material with a high energy density and a lithium secondary battery comprising the same. More specifically, the present invention relates to a cathode material comprising a mixture of an oxide powder (a) having a specific composition and an oxide powder (b) having a specific composition, wherein a mix ratio of the two oxide powders (oxide powder (a):oxide powder (b)) is 50:50 to 90:10.

BACKGROUND ART

In recent years, chargeable and dischargeable secondary batteries are widely used as energy sources of wireless mobile equipment. Of these, lithium secondary batteries are generally used due to advantages such as high energy density, discharge voltage and power stability.

Lithium secondary batteries use metal oxide such as $LiCoO_2$ as a cathode material and carbon as an anode material and are fabricated by inserting a polyolefin-based porous membrane between an anode and a cathode and swelling a non-aqueous electrolyte containing a lithium salt such as $LiPF_6$. $LiCoO_2$ is commonly used as a cathode material for lithium secondary batteries. $LiCoO_2$ has several disadvantages of being relatively expensive, having low charge/discharge capacity of about 150 mAh/g and unstable crystal structure at a voltage of 4.3 V or higher and the risk of reacting with an electrolyte to cause combustion. Furthermore, $LiCoO_2$ is disadvantageous in that it undergoes great variation in physical properties depending upon variation in parameters in the preparation process thereof. In particular, cycle properties and high-temperature storage properties at high electric potential may be greatly varied depending on partial variations of process parameters.

In this regard, methods to make batteries containing $LiCoO_2$ operate at high electric potential, such as coating the outer surface of $LiCoO_2$ with a metal (such as aluminum), thermally treating $LiCoO_2$, or mixing $LiCoO_2$ with other materials, have been suggested. Secondary batteries comprising such a cathode material exhibit low stability at high electric potential or have a limitation of application to mass-production.

In recent years, secondary batteries receive great attention as power sources of electric vehicles (EVs), hydride electric vehicles (HEV) or the like which are suggested as alternatives to conventional gasoline vehicles, diesel vehicles or the like using fossil fuels to solve air pollution caused thereby. Use of secondary batteries is expected to further increase and the above problems and problems associated with stability of batteries and high-temperature storage properties at high electric potentials arise.

In an attempt to solve the problems of $LiCoO_2$, methods using a mixture of two or more different lithium transition metal oxides as a cathode material were suggested. These methods solve the drawbacks of a cathode material in which the respective lithium transition metal oxide is used singly.

However, conventional mixture-type cathode materials have a limitation of the difficulty of obtaining superior synergetic effects to the case of simple combination of two ingredients.

DISCLOSURE

Technical Problem

Therefore, the present invention has been made to solve the above problems and other technical problems that have yet to be resolved.

One object of the present invention is to provide a cathode material exhibiting a high energy density and superior capacity properties.

Another object of the present invention is to provide a secondary battery which uses a cathode material exhibiting a high energy density and thereby exert superior rate properties.

Technical Solution

In accordance with an aspect of the present invention, the above and other objects can be accomplished by the provision of a cathode material comprising a mixture of an oxide powder (a) defined below and an oxide powder (b) selected from the group consisting of an oxide powder (b1) defined below and an oxide powder (b2) defined below and a combination thereof wherein a mix ratio of the two oxide powders (oxide powder (a):oxide powder (b)) is 50:50 to 90:10.

[Oxide Powder (a)]

An oxide powder represented by Formula 1 below:

$$Li_x(Co_yA_mD_z)O_t \qquad (1)$$

wherein $0.8 \le x \le 1.2$, $D \le z \le 0.3$, $1.8 \le t \le 4.2$, $(0.8-m-z) \le y \le (2.2-m-z)$, $0 \le m \le 0.3$, A is at least one selected from Mg and Ca, and D is at least one selected from the group consisting of Ti, Zr, Hf, V, Nb, Ta; Cr, Mo, W, Mn, Tc, Re, Fe, Ru, Os, Co, Rh, Ir, Ni, Pd, Pt, Cu, Au, Ag, Zn, Cd, Hg, B, Al, Ga, In, Tl, C, Si, Ge, Sn, Pb, N, P, As, Sb and Bi;

[Oxide Powder (b1)]

An oxide powder represented by Formula 2a below:

$$Li_x(Ni_{1-a-b}Mn_aCo_b)_yO_2 \qquad (2a)$$

wherein $0.05 \le a \le 0.4$, $0.1 \le b \le 0.4$, $0.4 \le 1-a-b \le 0.7$, $0.95 \le x \le 1.05$, $1.9 \le x+y \le 2.3$;

[Oxide Powder (b2)]

An oxide powder which contains a transition metal mixture of Ni, Mn and Co, has an average oxidation number of all transition metals except for lithium, larger than +3 and satisfies Equations 3 and 4 below:

$$1.1 < m(Ni)/m(Mn) < 1.5 \qquad (3)$$

$$0.4 < m(Ni^{2+})/m(Mn^{4+}) < 1 \qquad (4)$$

wherein m(Ni)/m(Mn) is a molar ratio of nickel to manganese and $(Ni^{2+})/m(Mn^{4+})$ is a molar ratio of $Ni^{2+}$ to $Mn^{4+}$.

In the present invention, the cathode material is a mixture of two types of lithium transition metal oxides, wherein the mixture consists of the oxide powder (a) and the oxide powder (b) at a ratio (weight ratio) of 50:50 to 90:10, thus exerting high energy density and exhibiting superior capacity properties. A more preferred mix ratio is 50:50 to 70:30.

As a result of intense and repeated research, the inventors of the present invention discovered that, when the oxide powder (b) is present in a mix ratio of 50% or less, lithium secondary batteries can exert considerably superior discharge capacity maintenance and desired rate properties at C-rate. Specifically, when the cathode material according to the present invention is used, lithium secondary batteries having a volumetric energy density (VED) of 478 Wh/l or more and a gravimetric energy density (GED) of 201 Wh/g can be fabricated.

On the other hand, when the oxide powder (b) is present in a mix ratio exceeding 50%, discharge capacity considerably decreases, and in particular, as C-rate increases, this decrease disadvantageously becomes serious, and when the oxide powder (b) is present in a mix ratio less than 10%, superior capacity properties cannot be disadvantageously exerted.

The oxide powders may be surface-coated with a material such as $Al_2O_3$ or mixed with $Al_2O_3$ to improve properties thereof The oxide powder (a) is for example preferably $LiCoO_2$, but the material is not limited thereto.

Of the oxide powder (b), the oxide powder (b1) satisfies a specific composition defined by Formula (2a) (see FIG. 1), thus exerting high capacity, superior cycle stability, superior storage stability and high temperature stability. Hereinafter, the oxide powder (b1) will be described in detail.

A total nickel molar ratio (1-a-b) is 0.4 to 0.7, an excess amount, as compared to manganese and cobalt. When the content of nickel is less than 0.4, high capacity cannot be expected, and when the content exceeds 0.7, safety is disadvantageously greatly deteriorated.

The content of the cobalt (b) is 0.1 to 0.4. When the content of cobalt is excessively high (b>0.4), the overall cost of raw materials increases and reversible capacity slightly decreases due to the high content of cobalt. On the other hand, when the content of cobalt is excessively low (b<0.1), both sufficient rate properties and high powder density of batteries cannot be accomplished.

When the content of lithium is excessively high (x>1.05), in particular, safety may be disadvantageously deteriorated during cycles at a high voltage (U=4.35 V) at T=60° C. On the other hand, when the content of lithium is excessively low (x<0.95), rate properties are lowered and reversible capacity may decrease.

In a preferred embodiment, in the oxide powder (b1), lithium ions are intercalated and deintercalated between mixed transition metal oxide layers ("MO layers"), some Ni ions derived from MO layers are inserted into intercalation and deintercalation layers of the lithium ions ("reversible lithium layer"), to bond the MO layers.

Hereinafter, in this specification, Ni inserted into the reversible lithium layer may also be referred to as an "inserted Ni".

Specifically, there was a conventional concept in which, in a case where some nickel moves downward from MO layers to the reversible lithium layer and are fixed to the reversible lithium layer, as shown in FIG. 2, the nickel will interfere with intercalation and deintercalation of lithium. On the other hand, the inventors of the present invention confirmed that, in this case, it is possible to stabilize crystal structures and prevent a problem in which the crystal structures are broken due to intercalation and deintercalation of lithium.

Accordingly, it is possible to avoid additional structural collapse by oxygen detachment, prevent further production of $Ni^{2+}$, improve both lifespan and safety, considerably improve battery capacity and cycle properties, and afford desired rate properties. The technical concept of the present invention is considered to be a major advance that will completely usurp conventional technology.

In the oxide powder (b1), $Ni^{2+}$ and $Ni^{3+}$ are preferably present together in MO layers. Of these, some $Ni^{2+}$ may be inserted into the reversible lithium layer. That is, the Ni ions inserted into the reversible lithium layer are preferably $Ni^{2+}$.

This $Ni^{2+}$ has a considerably similar size to lithium ions ($Li^+$) and is inserted into the reversible lithium layer, thus blocking structural collapse caused by the repulsive force of MO layers when lithium ions are intercalated during charging without deforming crystal structures.

In addition, the $Ni^{2+}$ is inserted between MO layers and supports the same. The $Ni^{2+}$ is contained in an amount capable of stably supporting the space provided between MO layers and thereby improving the desired charge stability and cycle stability. In addition, $Ni^{2+}$ is inserted in an amount which does not interfere with intercalation and deintercalation of lithium ions in the reversible lithium layer, to prevent deterioration in rate properties. That is, when a molar fraction of $Ni^{2+}$ inserted into the reversible lithium layer is excessively high, the amount of anions increases, and rock salt structures which have no electrochemical reactivity are locally formed and interfere with charging and discharging and thus cause a decrease in discharge capacity.

Generally, taking into consideration the above points, a molar fraction of $Ni^{2+}$ inserted into the reversible lithium layer is preferably 0.03 to 0.07, based on the total weight of transition metals of the oxide powder (b1).

Meanwhile, as a ratio of Li to the transition metal (M) (Li/M) decreases, the amount of Ni inserted into the MO layer gradually increases. When an excessively great amount of Ni goes downward to the reversible lithium layer, Ni interferes with movement of Li+ during charging and discharging, thus disadvantageously decreasing reversible capacity or deteriorating rate properties. On the other hand, when the ratio of Li/M is excessively high, the amount of Ni inserted into the MO layer is excessively small, thus disadvantageously causing structural instability and deteriorating battery safety and lifespan. Furthermore, in the case of excessively high Li/M value, the amount of un-reacted $Li_2CO_3$ increases, that is, a great amount of impurities is produced, thus causing deterioration of chemical resistance and high-temperature stability. Accordingly, in a preferred embodiment, a ratio of Li:M in $LiNiMO_2$ may be 0.95:1 to 1.04:1.

In a preferred embodiment, the oxide powder (b1) does not substantially contain a water-soluble base (in particular $Li_2CO_3$) as an impurity.

Generally, nickel-based lithium-containing transition metal oxide contains a great amount of water-soluble bases such as lithium oxide, lithium sulfate, lithium carbonate and the like. Such a water-soluble base may be firstly a base such as $Li_2CO_3$ and LiOH present in $LiNiMO_2$, and be secondly a base produced by ion exchange ($H^+$ (water)< - - - >$Li^+$ (surface, bulky outer surface)) on the surface of $LiNiMO_2$. The latter is commonly negligible.

The first water-soluble base is generally produced by unreacted lithium material during sintering. The reason is that a relatively great amount of lithium is added and sintered at a low temperature to prevent collapse of layered crystal structures of conventional nickel-based lithium-containing transition metal oxides, and as a result, nickel-based lithium-containing transition metal oxides have more grain boundaries, as compared to cobalt-based oxides and lithium ions are not sufficiently reacted during sintering.

On the other hand, as mentioned above, the oxide powder (b1) stably maintains layered crystal structures, can be sintered at relatively high temperatures under an air atmosphere and thus has relatively few crystal grain boundaries. In addition, remaining of unreacted lithium on particle surfaces is prevented and lithium salts such as lithium carbonate and lithium sulfate are thus not substantially present on the particle surfaces. In addition, in the process of preparing the oxide powder (b1), addition of an excess lithium source is unnecessary and a problem of formation of impurities by the un-reacted lithium source left in a powder can be fundamentally prevented.

As a result, many problems associated with presence of water-soluble bases, in particular, problems in which decomposition reaction of an electrolyte is accelerated at high temperatures to produce a gas and thereby impair battery safety, can be solved. Accordingly, lithium secondary batteries of the present invention have advantages of superior storage stability, high temperature stability and the potential for mass-production at a low cost.

Meanwhile, of the oxide powder (b), the oxide powder (b2) provides considerably improved high rate charge and discharge properties due to a superior layered crystal structure. Hereinafter, the oxide powder (b2) will be described in detail.

As a preferred example, the layered crystal structures is an $\alpha$-NaFeO$_2$ layered crystal structure.

It was known in the art that presence of Ni$^{2+}$ and Mn$^{4+}$ in equivalent amounts makes an average oxidation number of transition metal ions +3 in order to obtain a desired layered structure. However, since Ni$^{2+}$ has a size substantially similar to Li$^+$, it moves to the lithium layer and readily forms a sodium salt, thus disadvantageously causing deterioration in electrochemical properties.

Accordingly, the inventors of the present invention conducted a great deal of research to prepare a cathode active material which has a stable layered crystal structure and exhibits superior capacity and rate properties. As a result, the inventors discovered that the stable layered crystal structure depends on the size difference between the lithium ion and the transition metal ion, rather than Ni$^{2+}$ and Mn$^{4+}$.

Specifically, the inventors confirmed that, in lithium composite transition metal oxide having a layered crystal structure, as size difference between the ions constituting the reversible lithium layer and the MO layer (that is, lithium ions and transition metal ions) increases, the two layers can be readily separated and grown.

In this regard, use of metal elements having a small ion size for the MO layer to increase size difference between ions may be considered. However, this approach enables formation of the desired layered structure, but has a limitation of relatively low capacity due to decrease in the number of metal ions to transfer electrons.

In this regard, the inventors of the present invention attempted to accomplish the desired layered crystal structure without causing deterioration in capacity. As a result, the inventors confirmed that the size difference between the ions is expressed by the bonding distance between each ion and the oxygen ion or bonding force therebetween, and as a metal having cationic characteristics has an increased oxidation number, it has a decreased ionic radius. In addition, the inventors considered that the difference between the MO layer and the lithium layer can be increased by increasing the oxidation number of transition metals. This expectation was confirmed through a great deal of experimentation.

The idea that the layered crystal structure can be suitably formed through increased size difference between the lithium ion and the transition metal ion by increasing the average oxidation number of the transition metal to a level higher than +3 is in contrast to the conventional idea accepted in the art that the average oxidation number of transition metals should be adjusted to +3 to stabilize the layered crystal structure.

Meanwhile, in a case where the contents of Ni and Mn are substantially equivalent in accordance with a conventional method, Mn$^{4+}$ ions induce formation of Ni$^{2+}$ ions, and disadvantageously, in a Mn-rich compound, a great amount of Ni$^{2+}$ is thus arranged in the lithium layer.

The inventors of the present invention predicted that the best method to increase the oxidation number of transition metals would be to adjust the total average oxidation number to +3 or higher by decreasing the amount of Ni$^{2+}$, which can be readily permeated into the lithium layer. This prediction is based on the idea that the amount of Ni$^{3+}$ having a size smaller than Ni$^{2+}$ increases, thus causing an increase in size difference between the ions.

Accordingly, the oxide powder (b2) contains nickel and manganese wherein nickel is present in an amount higher than manganese (See Equation (3)) and Ni$^{2+}$ is present in an amount smaller than Mn$^{4+}$ (See Equation (4)). Specifically, the oxide powder (b2) is a lithium nickel-manganese-cobalt oxide wherein (i) an average oxidation number of nickel-manganese-cobalt, all transition metals except for lithium is larger than +3, (ii) nickel is present in an amount larger than manganese and (iii) Ni$^{2+}$ is present in an amount smaller than Mn$^{4+}$.

Such a lithium nickel-manganese-cobalt oxide maintains an average oxidation number of transition metals at a level larger than +3, thus considerably decreasing the amount of transition metals present in the reversible lithium layer based on the stable crystal structure of the cathode material and improving mobility of lithium ions and rate properties as well as capacity.

Regarding the aspect (i), the oxide powder (b2) has an average oxidation number of transition metals except lithium, higher than +3, thus decreasing an average size of transition metal ions, increasing the size difference between lithium ions, and promoting separation between layers, thereby forming a stable layered crystal structure.

When the average oxidation number of transition metals is excessively increased, electric charges capable of transferring lithium ions are decreased, thus disadvantageously decreasing capacity. Preferably, the average oxidation number of transition metals is higher than 3.0 and not higher than 3.5, more preferably, 3.01 to 3.3, more particularly preferably, 3.1 to 3.3.

In this case, the total average oxidation number of Mn and Ni corresponding thereto is 3.0 to 3.5, preferably, 3.1 to 3.3.

As herein used, the expression "average oxidation number of transition metals except for lithium" means, that, for example, an average oxidation number of lithium ions is not considered, although some lithium ions are contained in the site of transition metals.

Control of average oxidation number of transition metals is for example carried out by controlling a ratio of a transition metal of a transition metal precursor and the amount of a lithium precursor reacted in the process of preparing lithium transition metal oxide.

Regarding the aspect (ii), the oxide powder (b2) is composed of a material in which a molar ratio of nickel to manganese is higher than 1.1 and lower than 1.5, as represented by Equation (3) below.

$$1.1 < m(Ni)/m(Mn) < 1.5 \tag{3}$$

As such, when nickel is present in an larger amount than manganese, nickel in an amount corresponding to the difference between the nickel content and the manganese content, is changed to Ni$^{3+}$, thus decreasing ion size. Accordingly, the average size difference between the lithium ion and the transition metal ion increases, thus minimizing permeation of $Ni^{2+}$ into the lithium layer and improving stability of the layered crystal structure.

When m(Ni)/m(Mn) is larger than 1.5, disadvantageously, safety is deteriorated and preparation cost of active materials increases due to decreased Mn content. In a more preferred embodiment, the ratio of m(Ni)/m(Mn) may be 1.2 to 1.4.

On the other hand, although the content of manganese is larger than that of nickel, in a case where an average oxidation number of transition metals is +3 or higher, the layered crystal structures are formed, but +4 ions which do not contribute to charging/discharging are increased and capacity is thus decreased.

As mentioned above, in the case where the oxide powder (b2) according to the present invention contains excess nickel, as compared to manganese, the nickel is composed of nickel (1) present in an excessive amount, as compared to the manganese content and nickel (2) present in an amount corresponding to the manganese content.

The nickel has an average oxidation number higher than 2+.

Preferably, the nickel (1) is $Ni^{3+}$, and the nickel (2) includes both $Ni^{2+}$ and $Ni^{3+}$.

Of the nickel (2) including $Ni^{2+}$ and $Ni^{3+}$, a ratio of $Ni^{3+}$ is preferably 11 to 60%. That is, when the ratio is lower than 11%, desired electrochemical properties cannot be obtained, and when the ratio is higher than 60%, variation in oxidation number is excessively small, thus disadvantageously increasing a capacity decrease and a dispersed lithium amount. In this case, the average oxidation number of manganese and nickel is about 3.05 to about 3.35.

Regarding the aspect (iii), the oxide powder (b2) is composed of a material in which a molar ratio of $Ni^{2+}$ to $Mn^{4+}$ is higher than 0.4 and lower than 1, as represented by Equation (4). That is, $Ni^{2+}$ and $Mn^{4+}$ are not present in equivalent amounts, but $Ni^{2+}$ is present in a smaller amount than $Mn^{4+}$.

$$0.4 < m(Ni^{2+})/m(Mn^{4+}) < 1 \qquad (4)$$

When the ratio of $m(Ni^{2+})/m(Mn^{4+})$ is 1 or higher, the average oxidation number of transition metals does not increase and ion size difference thus cannot be induced, and when the ratio is 0.4 or lower, the oxidation number of transition metals is excessively high, capacity is deteriorated due to decrease in amount of movable electric charges. When the ratio of $m(Ni^{2+})/m(Mn^{4+})$ is higher than 0.4 and is equivalent to or lower than 0.9, considerably superior electrochemical properties can be obtained.

In the oxide powder (b2), the content of cobalt (Co) in transition metals may be lower than 10 mol % of the total transition metal content. An increase in cobalt content causes disadvantages of cost increase and unstable $Co^{4+}$ and low stability during charging.

As mentioned above, in the oxide powder (b2), since nickel is present in an amount higher than manganese and an average oxidation number of transition metals is higher than +3, the size difference between the lithium ions and the transition metal ions increases, layer separation is accelerated, and insertion of $Ni^{2+}$ into the lithium layer can be minimized. In the cathode material, the content of nickel inserted into lithium sites is lower than 5 mol %, as a ratio of $Ni(Ni^{2+})$ sites with respect to the total Li sites.

Nickel, manganese and cobalt, as transition metals present in the oxide powder (b2) may be partially substituted by other metal element (s), and preferably by other metal (s), anionic element (s) or the like in a small amount of 5% or less so long as they maintain layered crystal structures. Obviously, this case is within the scope of the present invention so long as the features of the present invention are satisfied.

Meanwhile, the oxide powder (a) preferably may have a monolithic structure. Accordingly, the oxide powder (a) has no or little inner porosity and exhibits improved stability of crystal particles, as the size of particles increases, thus enabling easy manufacture of batteries comprising the same and improving manufacturing process efficiency.

For example, the oxide powder (a) is a potato shaped monolithic particle and may have D50 of 10 µm or more, preferably 15 µm or more.

Meanwhile, the oxide powder (b) preferably has an agglomerated structure, that is, a form of an agglomerate of micro powders and may have an inner porosity. Such an agglomerated particle structure maximizes a surface area which reacts with an electrolyte, thus exerting high rate properties and increasing reversible capacity of the cathode.

For example, the agglomerated oxide powder (b) is in the form of an agglomerate of microparticles of 1 µm to 5 µm and has D50 of 10 µm or less, preferably 8 µm to or less, more preferably 4 to 7 µm. Particularly preferably, an agglomerate of 90% or more of microparticles having a size of 1 to 4 µm (D50) may constitute an oxide powder (b).

The present invention also provides a lithium secondary battery comprising the cathode material. Generally, the lithium secondary battery comprises a cathode, an anode, a separator interposed between the electrodes and a lithium-containing non-aqueous electrolyte.

For example, the cathode is prepared by applying a cathode mix comprising a cathode active material, a conductive material and a binder to a cathode current collector, followed by drying and pressing. The cathode mix may further comprise a filler, if necessary.

The cathode current collector is generally produced to have a thickness of 3 to 500 µm. There is no particular limit to the cathode current collector, so long as it has suitable conductivity without causing adverse chemical changes in the produced battery. Examples of the cathode current collector include stainless steel, aluminum, nickel, titanium, sintered carbon, and aluminum or stainless steel surface-treated with carbon, nickel, titanium, silver or the like. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The conductive material is commonly added in an amount of 1 to 30% by weight, based on the total weight of the mixture including the cathode active material. Any conductive material may be used without particular limitation so long as it has suitable conductivity without causing adverse chemical changes in the produced secondary battery. Examples of conductive materials that can be used in the present invention include graphite such as natural or artificial graphite; carbon black such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the compound including the anode active material. Examples of the binder include polyvinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluororubbers and various copolymers.

The filler is a component used to inhibit expansion of the cathode. There is no particular limit to the filler, so long as it does not cause adverse chemical changes in the produced battery and is a fibrous material. As examples of the filler, there may be used olefin polymers such as polyethylene and polypropylene; and fibrous materials such as glass fibers and carbon fibers.

For example, the anode is prepared by applying an anode active material to an anode current collector, followed by drying. The anode active material may further comprise the afore-mentioned ingredients, i.e., the conductive material, the binder and the filler.

The anode current collector is generally produced to have a thickness of 3 to 500 μm. There is no particular limit to the anode current collector, so long as it has suitable conductivity without causing adverse chemical changes in the produced battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesion to the anode active materials. In addition, the current collectors may be used in various forms including films, sheets, foils, nets, porous structures, foams and non-woven fabrics.

In addition, examples of anode active materials that can be used in the present invention include carbons such as hard carbons and graphite carbons; metal composite oxides such as $Li_yFe_2O_3$ ($0 \leq y \leq 1$), $Li_yWO_2$ ($0 \leq y \leq 1$), $Sn_xMe_{1-x}Me'_yO_z$ (Me: Mn, Fe, Pb, Ge; Me': Al, B, P, Si, Group I, II and III elements of the Periodic Table, halogens; $0<x\leq1$; $1\leq y\leq3$; $1\leq z\leq8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like; conductive polymers such as polyacetylene, Li—Co—Ni materials and combinations thereof.

The separator is an insulating thin film having high ion permeability and mechanical strength and typically has a pore diameter of 0.01 to 10 μm and a thickness of 5 to 300 μm. Examples of useful separators include, but are not limited to polymers having a microporous structure such as polyethylene, polypropylene, polytetrafluoroethylene, polyethylene terephthalate, polybutylene terephthalate, polyethylene naphthalate and combinations thereof.

In addition, one side or two sides of the separator may be coated with an inorganic material.

The lithium-containing non-aqueous electrolyte is composed of a non-aqueous electrolyte and a lithium salt.

Examples of the non-aqueous electrolytic solution include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate and combinations thereof.

Preferably, a combination of one or more of a cyclic carbonate solvent and a linear carbonate solvent is used.

In addition, preferably, ethylene carbonate or a combination of ethylene carbonate and ethylmethylcarbonate is used.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, imide and a combination thereof.

As the non-aqueous electrolyte, an organic or inorganic solid electrolyte may be used.

Examples of the organic solid electrolyte include polyethylene derivatives, polyethylene oxide derivatives, polypropylene oxide derivatives, phosphoric acid ester polymers, polyagitation lysines, polyester sulfide, polyvinyl alcohol, poly (vinylidene fluoride) and polymers containing ionic dissociations groups.

Examples of the inorganic solid electrolyte include lithium nitrides, lithium halogenides and lithium sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally contain carbon dioxide gas.

In a preferred embodiment, the secondary battery may be a pouch battery in which an electrode assembly is sealed in a pouch-type case made of a laminate sheet including a resin layer and a metal layer.

For example, the laminate sheet may have a structure including an inner resin layer, a blocking metal layer and an outer resin layer. The outer resin layer should have tensile strength and weatherability equal to or higher than a predetermined level in order to secure superior resistance to external environments. In this regard, the polymer resin for the outer resin layer is preferably a polyethylene terephthalate (PET) and drawn nylon film. The blocking metal layer is preferably aluminum to prevent incorporation and leakage of foreign materials such as gas and humidity and improve strength of the battery case. The polymer resin for the inner resin layer is preferably a polyolefin resin which has thermal fusion (thermal adhesion) and low absorbance in order to inhibit invasion of the electrolyte and is not swollen or precipitated by the electrolyte, more preferably undrawn polypropylene (CPP).

BRIEF DESCRIPTION OF THE DRAWINGS

The above and other objects, features and other advantages of the present invention will be more clearly understood from the following detailed description taken in conjunction with the accompanying drawings, in which.

BEST MODE

Figure 1:
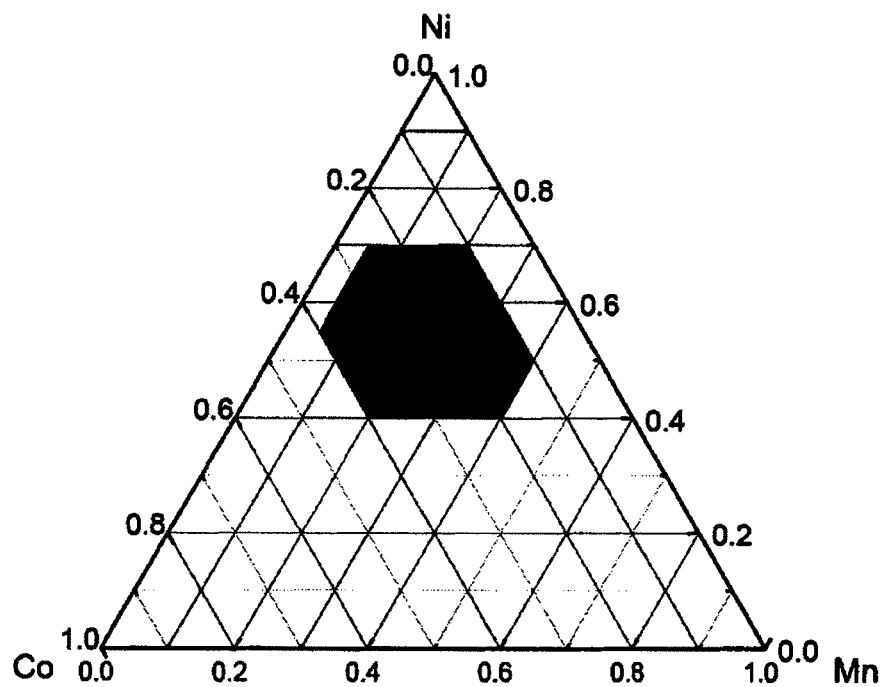
FIG. 1 is a schematic view illustrating the crystal structure of an oxide powder (b) according to one embodiment of the present invention.
Figure 2:
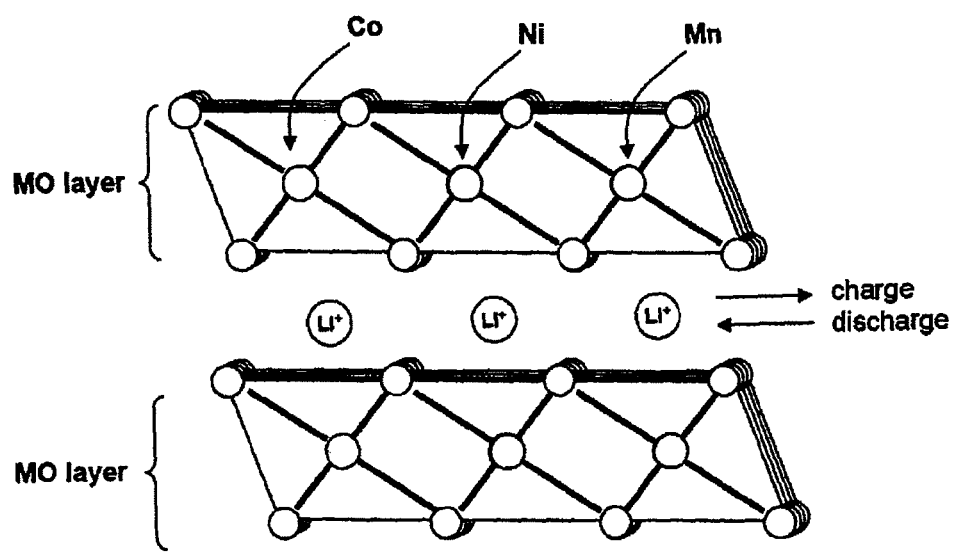
FIG. 2 is a graph showing a preferred composition range of an oxide powder (b) according to one embodiment of the present invention.

Now, the present invention will be described in more detail with reference to the following examples. These examples are provided only for illustrating the present invention and should not be construed as limiting the scope and spirit of the present invention.

Preparation Example 1

Preparation of Oxide Powder (b)

Mixed hydroxide MOOH (M=$Ni_{4/15}(Mn_{1/2}Ni_{1/2})_{8/15}Co_{0.2}$) was used as a mixed transition metal precursor, the mixed hydroxide was mixed with $Li_2CO_3$ at a stoichiometric ratio (Li:M=1.02:1), and the mixture was sintered in air at 920° C. for 10 hours to prepare $LiNi_{0.53}Co_{0.2}Mn_{0.27}O_2$. At this time, secondary particles did not collapse and were still maintained.

It could be confirmed by X-ray analysis that all samples had well-grown layer crystal structures. In addition, unit cell volume did not considerably vary as sintering temperature increased. This means that considerable oxygen deficiency and considerable increase in anion mixing did not occur and evaporation of lithium substantially did not occur.

It was confirmed that $LiNi_{0.53}Co_{0.2}Mn_{0.27}O_2$ has a structure in which nickel is incorporated in about 3.9 to about 4.5% in a reversible lithium layer and a suitable amount of $Ni^{2+}$ is incorporated in the reversible lithium layer, thus exhibiting structural stability.

Example 1

$LiCoO_2$ having a monolithic structure and D50 of about 15 to about 20 μm and $LiNi_{0.53}Co_{0.2}Mn_{0.27}O_2$ having D50 of about 5 to 8 μm, as an agglomerate of micro particles a size of about 1 to about 2 μm obtained in Preparation Example 1-1 were mixed at a ratio of 50:50 to prepare a cathode material mix.

The cathode material mix, Super P as a conductive material and polyvinylidene fluoride as a binder were mixed at a weight ratio 92:4:4, and N-methyl pyrrolidone (NMP) was added thereto to prepare a slurry. The cathode slurry was applied to an aluminum collector, followed by drying in a vacuum oven at 120° C. to produce a cathode.

In addition, mesocarbon microbead (MCMB) as an anode active material, super P as a conductive material and PVdF as a binder were mixed at a weight ratio of 92:2:6, followed by dispersion in NMP and coating on a copper foil, to produce an anode.

A porous membrane made of polypropylene was inserted between the anode and cathode thus obtained to manufacture an electrode assembly. The electrode assembly was added to a pouch-type case, an electrode lead was connected, and a solution consisting of ethylene carbonate (EC) and dimethyl carbonate (DMC) (1:1, volume ratio) containing 1M $LiPF_6$ was inserted as an electrolyte, followed by sealing to assemble a lithium secondary battery.

Example 2

A cathode material mix was prepared and a lithium secondary battery was produced in the same manner as in Example 1 except that a weight ratio of $LiCoO_2$ and $LiNi_{0.53}Co_{0.2}Mn_{0.27}O_2$ in the cathode material mix was 70:30.

Comparative Example 1

A cathode material mix was prepared and a lithium secondary battery was produced in the same manner as in Example 1 except that a weight ratio of $LiCoO_2$ and $LiNi_{0.53}Co_{0.2}Mn_{0.27}O_2$ in the cathode material mix was 40:60.

Comparative Example 2

A cathode material mix was prepared and a lithium secondary battery was produced in the same manner as in Example 1 except that $LiNi_{1/3}Co_{1/3}Mn_{1/3}O_2$ was used instead of $LiNi_{0.53}Co_{0.2}Mn_{0.27}O_2$.

Experimental Example 1

Discharge capacity (1C rate charge) of batteries produced in Examples 1 and 2 and the battery produced in Comparative Example 1 were measured at 0.2C, 0.5 C, 1C, 1.5C and 2C rate and a ratio of discharge capacity at each C-rate with respect to 5C rate capacity was calculated. The results thus obtained are shown in FIG. 3.

Figure 3:
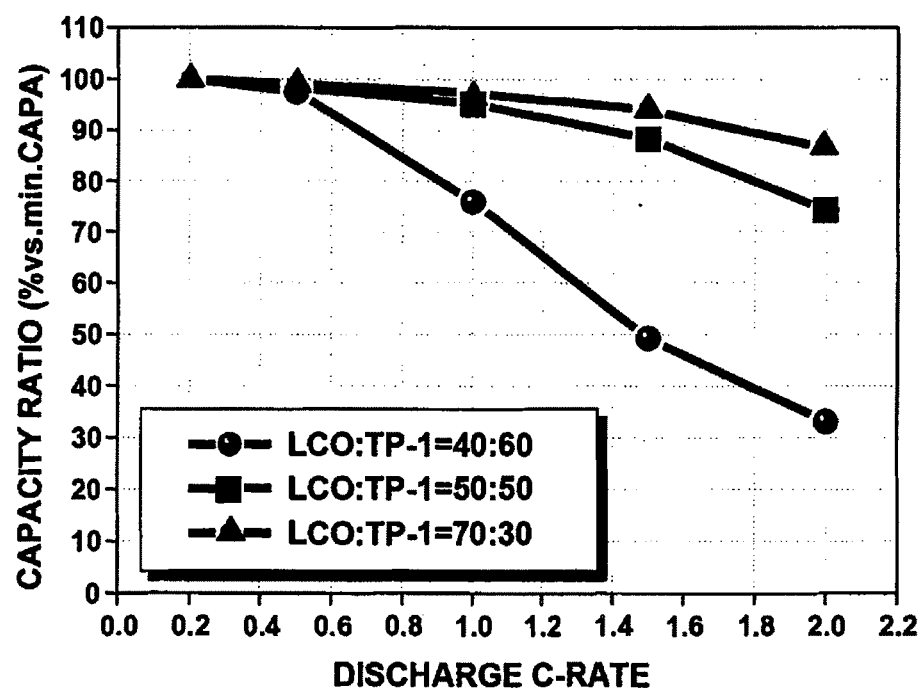
FIG. 3 is a graph showing a discharge capacity ratio in Experimental Example 1.

As can be seen from FIG. 3, discharge capacity of the battery of Comparative Example 2 rapidly decreases, as C-rate increases, and on the other hand, batteries of Examples 1 and 2 of the present invention exhibited considerably superior C-rate properties, and in particular, the battery of Example 2 containing 30% of oxide (b) exhibited superior C-rate properties in which discharge capacity is as high as 90% or more at a 2C rate. In addition, it can be seen that this improvement in C-rate properties was exhibited even at a low C-rate of 1C, and batteries of Examples 1 and 2 exhibited more considerable improvement in discharge properties, as C-rate thereof increases.

As apparent from the fore-going, use of combination of lithium cobalt oxide and lithium nickel manganese cobalt oxide alone cannot exhibit desired rate properties, and when a material having a predetermined composition is mixed with these substances at a specific mix ratio, synergetic effects can be obtained.

INDUSTRIAL APPLICABILITY

As apparent from the above description, the secondary battery of the present invention can exert high energy density as well as high capacity by using a combination of an oxide powder (a) having a specific composition and an oxide powder (b) having a specific composition, as a cathode material and by controlling the mix ratio of these oxide powders to a predetermined range. In particular, the oxide powder (b) has a stable layered structure and thus improves stability of crystal structures during charge and discharge. Accordingly, the battery containing this cathode material has advantages of high capacity, superior cycle stability and improved overall battery performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode material comprising a mixture of an oxide powder (a) defined below and an oxide powder (b2) defined below and a combination thereof wherein a mix ratio of the two oxide powders (oxide powder (a):oxide powder (b2)) is 50:50 to 90:10;

[oxide powder (a)]

an oxide powder represented by Formula I below:

$$Li_x(Co_yA_mD_z)O_t \qquad (1)$$

wherein $0.8 \leq x \leq 1.2$, $0 \leq z \leq 0.3$, $1.8 \leq t \leq 4.2$, $(0.8-m-z) \leq y \leq (2.2-m-z)$, $0 \leq m \leq 0.3$, A is at least one selected from Mg and Ca, and D is at least one selected from the group consisting of Ti, Zr, Hf, V, Nb, Ta; Cr, Mo, W, Mn, Tc, Re, Fe, Ru, Os, Co, Rh, Ir, Ni, Pd, Pt, Cu, Au, Ag, Zn, Cd, Hg, B, Al, Ga, In, Tl, C, Si, Ge, Sn, Pb, N, P, As, Sb and Bi;

[oxide powder (b2)]

an oxide powder which contains a transition metal mixture of Ni, Mn and Co, has an average oxidation number of all transition metals except for lithium, larger than +3 and satisfies Equations 3 and 4 below:

$$1.1 < m(Ni)/m(Mn) < 1.5 \qquad (3)$$

$$0.4 < m(Ni^{2+})/m(Mn^{4+}) < 1 \qquad (4)$$

wherein $m(Ni)/m(Mn)$ is a molar ratio of nickel to manganese and $m(Ni^{2+})/m(Mn^{4+})$ is a molar ratio of $Ni^{2+}$ to $Mn^{4+}$.

2. The cathode material according to claim 1, wherein a mix ratio of the oxide powders is 50:50 to 70:30.

3. The cathode material according to claim 1, wherein the oxide powder (a) is $LiCoO_2$.

4. The cathode material according to claim 1, wherein, in the oxide powder (b2), $m(Ni)/m(Mn)$ satisfies $1.2 \leq m(Ni)/m(Mn) \leq 1.4$.

5. The cathode material according to claim 1, wherein, in the oxide powder (b2), the average oxidation number of transition metals other than lithium is higher than 3.0 and is lower than or equal to 3.5.

6. The cathode material according to claim 1, wherein the nickel in the oxide powder (b2) is composed of nickel (1) present in an excessive amount, as compared to the manganese content, and nickel (2) present in an amount corresponding to the manganese content.

7. The cathode material according to claim 1, wherein the nickel in the oxide powder (b2) has an average oxidation number higher than 2+.

8. The cathode material according to claim 6, wherein the nickel (1) is $Ni^{3+}$.

9. The cathode material according to claim 6, wherein an average oxidation number of the nickel (2) is higher than 3.0 and is lower than or equal to 3.5.

10. Ile cathode material according to claim 6, wherein the nickel (2) contains $Ni^{2+}$ and $Ni^{3+}$.

11. The cathode material according to claim 6, wherein a ratio of $Ni^{3+}$ in the nickel (2) is 11 to 60%.

12. The cathode material according to claim 1, wherein the content of $Ni(Ni^{2+})$ sites in the total lithium site in the oxide powder (b2) is lower than 5 mol %.

13. The cathode material according to claim 1, wherein the oxide powder (a) is a monolithic particle and the oxide powder (b2) is an agglomerated particle composed of an agglomerate of micro particles.

14. The cathode material according to claim 1, wherein the oxide powder (a) has a D50 of 15 μm or more and the oxide powder (b2) has a D50 of 8 μm or less.

15. The cathode material according to claim 14, wherein the oxide powder (a) has a D50 of 20 to 30 μm and the oxide powder (b2) has a D50 of 4 to 7 μm.

16. The cathode material according to claim 15, wherein 90% or more of the oxide powder (b2) is an agglomerate of micro particles having a size of 1 to 4 μm.

17. A lithium secondary battery comprising the cathode material according to claim 1.

18. The lithium secondary battery according to claim 17, wherein the lithium secondary battery is a pouch battery in which an electrode assembly is sealed in a pouch-type case made of a laminate sheet including a resin layer and a metal layer.

* * * * *